(12) United States Patent
Nelson et al.

(10) Patent No.: US 10,653,107 B2
(45) Date of Patent: May 19, 2020

(54) RECONFIGURABLE PET POTTY SYSTEM WITH AUTOMATIC LOCKING JOINT AND METHOD OF MANUFACTURE

(71) Applicants: Shane Nelson, Overland Park, KS (US); Gary Nielsen, Overland Park, KS (US)

(72) Inventors: Shane Nelson, Overland Park, KS (US); Gary Nielsen, Overland Park, KS (US)

(73) Assignee: Adjustajoints, LLC, Overland Park, KS (US)

( * ) Notice: Subject to any disclaimer, the term of this patent is extended or adjusted under 35 U.S.C. 154(b) by 1034 days.

(21) Appl. No.: 15/075,365

(22) Filed: Mar. 21, 2016

(65) Prior Publication Data

US 2017/0265426 A1 Sep. 21, 2017

(51) Int. Cl.
*A01K 1/03* (2006.01)
*A01K 1/01* (2006.01)

(52) U.S. Cl.
CPC .................................. *A01K 1/0125* (2013.01)

(58) Field of Classification Search
CPC .... A01K 1/033; A01K 1/0254; A01K 1/0125; A01K 1/0245; A01K 1/029; A01K 1/034; A01K 31/08; A01K 1/0035; A01K 1/0107; A01K 1/0353; A47D 13/063; A47D 7/002; A47D 11/005; A47D 13/02; A47D 15/003; A47D 1/002; A47D 5/00; A47D 7/04; A47D 9/005
USPC ....... 119/498, 497, 168, 496, 499, 500, 474, 119/706, 170, 479, 482, 484; 5/99.1, 5/114, 417, 655, 93.2, 98.1
See application file for complete search history.

(56) References Cited

U.S. PATENT DOCUMENTS

| | | | | |
|---|---|---|---|---|
| 875,206 A | * | 12/1907 | Osborne | E04H 15/44 135/157 |
| 1,410,830 A | * | 3/1922 | O'Neal | E04H 15/06 135/143 |
| 1,526,038 A | * | 2/1925 | Allman | A47C 19/122 135/143 |
| 2,850,027 A | * | 9/1958 | Smith | A63H 33/044 135/115 |
| 4,181,356 A | * | 1/1980 | Fleischer | A47C 1/146 248/370 |
| 4,376,318 A | * | 3/1983 | Cirillo | A47D 13/063 5/114 |

(Continued)

OTHER PUBLICATIONS http://www.adjustablelookingtech.com/products_variloc_plastic. php dated Dec. 16, 2016 titled "Medium Duty Thermoplastic Locking Hinges", 1 page.

*Primary Examiner* — Yvonne R Abbott-Lewis
(74) *Attorney, Agent, or Firm* — Polsinelli PC; Adam C. Rehm (57) ABSTRACT

A reconfigurable pet potty system that is selectively configurable between use and storage configurations. In the use configuration, the system is operable to be used as a toilet by a pet. In the storage configuration, the system is collapsed, with its footprint minimized, thereby facilitating transport and/or storage of the system. The system includes a plurality of different types of joints including a pivot joint that is operable to automatically lock the system in either of the configurations to prevent unintentional transformations of the system between the different configurations.

20 Claims, 12 Drawing Sheets

(56) References Cited

U.S. PATENT DOCUMENTS

| | | | | |
|---|---|---|---|---|
| 4,527,512 A * | 7/1985 | Sugiura | A01K 31/08 | 119/499 |
| 4,641,387 A * | 2/1987 | Bondy | A61G 7/0526 | 5/284 |
| 4,787,335 A * | 11/1988 | Carlyon | A01K 1/0107 | 119/170 |
| 4,846,103 A * | 7/1989 | Brown | A01K 1/0125 | 119/168 |
| 4,979,469 A | 12/1990 | Clark | | |
| 5,014,649 A * | 5/1991 | Taft | A01K 1/0125 | 119/168 |
| 5,078,096 A * | 1/1992 | Bishop | A01K 1/0254 | 119/497 |
| 5,143,468 A | 9/1992 | Pausch | | |
| 5,163,532 A | 11/1992 | McCarty | | |
| 5,320,065 A * | 6/1994 | Leopold | A01K 15/025 | 119/498 |
| 5,384,925 A * | 1/1995 | Vail | A47C 29/006 | 5/310 |
| 5,542,134 A * | 8/1996 | Wang | A47D 13/063 | 5/99.1 |
| 5,544,864 A * | 8/1996 | Gabriel-Lacki | A47D 7/002 | 256/25 |
| 5,586,363 A | 12/1996 | Fanuzzi | | |
| 5,689,999 A | 11/1997 | Wiley et al. | | |
| 5,711,040 A * | 1/1998 | Huang | A47D 13/063 | 5/98.1 |
| 5,727,265 A | 3/1998 | Ziegler et al. | | |
| 5,771,651 A * | 6/1998 | Shiina | E04H 15/48 | 52/641 |
| 5,967,090 A * | 10/1999 | Hui | A01K 1/0245 | 119/453 |
| 6,076,485 A * | 6/2000 | Peeples | A01K 1/0254 | 119/496 |
| 6,125,483 A * | 10/2000 | Stroud | A47D 13/063 | 135/128 |
| 6,131,534 A * | 10/2000 | Axelrod | A01K 1/0245 | 119/497 |
| 6,196,568 B1 | 3/2001 | Stevens | | |
| 6,216,291 B1 * | 4/2001 | Eads | A61G 7/0526 | 135/121 |
| 6,263,529 B1 * | 7/2001 | Chadwick | A47C 21/08 | 5/414 |
| 6,644,611 B1 | 11/2003 | Tai | | |
| 6,715,446 B2 * | 4/2004 | Chou | A01K 1/033 | 119/497 |
| 6,772,458 B2 * | 8/2004 | Ellen | A47C 21/08 | 135/143 |
| D512,799 S | 12/2005 | Simpson | D30/108 | |
| 7,021,242 B2 * | 4/2006 | Axelrod | A01K 1/0245 | 119/496 |
| 7,044,083 B2 * | 5/2006 | Farmer | A01K 1/0254 | 119/474 |
| 7,047,991 B2 * | 5/2006 | Kline | A47C 21/08 | 135/96 |
| 7,322,056 B2 * | 1/2008 | Cloward | A47C 15/008 | 5/414 |
| 7,340,789 B2 * | 3/2008 | Cloward | A47C 15/008 | 5/414 |
| 7,415,739 B2 * | 8/2008 | Tharalson | A47D 5/00 | 5/655 |
| 7,430,770 B2 * | 10/2008 | Ramirez | A47C 21/08 | 5/414 |
| 7,481,182 B2 * | 1/2009 | Simpson | A01K 1/0125 | 119/168 |
| 7,523,719 B2 * | 4/2009 | Miller | A01K 1/0254 | 119/496 |
| 7,631,575 B2 | 12/2009 | Gard et al. | | |
| 7,681,260 B2 * | 3/2010 | Hallock | A61G 7/012 | 5/424 |
| 7,703,416 B2 * | 4/2010 | Farmer | A01K 1/0254 | 119/474 |
| 7,735,167 B2 * | 6/2010 | Kline | A47C 21/00 | 5/414 |
| 7,789,927 B2 * | 9/2010 | Tramontina | E04G 21/243 | 160/351 |
| 7,958,904 B2 * | 6/2011 | Lau | A01M 31/025 | 135/147 |
| 7,971,596 B2 * | 7/2011 | Morris | A47D 7/00 | 135/133 |
| 8,141,519 B2 * | 3/2012 | Salzman | A01K 15/024 | 119/482 |
| 8,261,381 B2 * | 9/2012 | Hallock | A61G 7/012 | 5/611 |
| 8,276,223 B1 * | 10/2012 | Connor | A47C 21/00 | 135/124 |
| 8,333,209 B2 * | 12/2012 | Daas | E04B 1/3441 | 135/143 |
| D681,146 S * | 4/2013 | Sperry | D21/838 | |
| 8,407,835 B1 * | 4/2013 | Connor | A47C 31/004 | 135/124 |
| 8,621,815 B2 * | 1/2014 | Daas | E04C 3/005 | 52/632 |
| 8,656,863 B2 | 2/2014 | Havluciyan | | |
| 8,763,560 B2 * | 7/2014 | Chang | A01K 1/0254 | 119/497 |
| 9,068,602 B2 | 6/2015 | Hoe et al. | | |
| 9,279,268 B2 * | 3/2016 | Liu | E04H 15/48 | |
| 9,485,957 B2 * | 11/2016 | Kellogg | A01K 1/034 | |
| 9,521,826 B2 * | 12/2016 | Rybka | A01K 15/02 | |
| 9,657,514 B1 * | 5/2017 | Whittemore | E04G 21/241 | |
| 9,938,746 B2 | 4/2018 | Parsons | | |
| 10,010,463 B1 * | 7/2018 | King | A61G 7/0005 | |
| 2003/0127059 A1 | 7/2003 | Smith, Jr. | A01K 1/0254 | 119/496 |
| 2003/0202840 A1 | 10/2003 | Watkins | | |
| 2003/0221924 A1 * | 12/2003 | Tong | A45C 7/0036 | 190/107 |
| 2005/0103279 A1 * | 5/2005 | Brewer | A01K 1/033 | 119/498 |
| 2005/0229866 A1 * | 10/2005 | Simpson | A01K 1/0245 | 119/499 |
| 2006/0186119 A1 * | 8/2006 | Zheng | D06F 95/002 | 220/9.2 |
| 2007/0251463 A1 * | 11/2007 | Lu | A01K 1/03 | 119/452 |
| 2012/0234252 A1 * | 9/2012 | Donta | A01K 1/0125 | 119/168 |
| 2016/0242384 A1 | 8/2016 | Huntinghouse | | |
| 2017/0079238 A1 * | 3/2017 | Renforth | A01K 1/0353 | |
| 2017/0339911 A1 | 11/2017 | Fitch | | |
| 2018/0030752 A1 | 2/2018 | Chen | | |

* cited by examiner

RECONFIGURABLE PET POTTY SYSTEM WITH AUTOMATIC LOCKING JOINT AND METHOD OF MANUFACTURE

BACKGROUND

1. Field of the Invention

The present inventive concept relates to an indoor toilet system for use by a pet, and more specifically to a reconfigurable pet potty system with an automatic-locking joint to prevent unintended transformations between various configurations.

2. Description of Related Art

In today's society, it is a common practice for a pet owner to allow a pet, e.g., a dog and/or cat, to live indoors. This practice of housing pets indoors is generally problematic because it is undesirable for the pet to go to the bathroom indoors, e.g., on carpet or other finished surface. As such, the owner must either escort the pet outdoors each time the pet needs to go to the bathroom or install a specialized door, e.g., a "doggy door," to allow the pet to go outside at will.

In virtually all scenarios, the pet must be trained to refrain from going to the bathroom indoors. Further, if the owner is unable to install a specialized door, which is a luxury that is unavailable to many pet owners, the pet must also be trained to signal the pet owner each time the pet needs to go to the bathroom. Before the training process and during, as such typically involves repeated trials and errors, it is common for the pet to go to the bathroom indoors multiple times. Further, even after the training is complete, it is common for the pet to have accidents, e.g., if the pet owner is unavailable and cannot escort the pet outdoors when the pet needs to go to the bathroom, or the pet fails to adhere to the training.

Conventional indoor pet potty devices suffer from a variety of shortcomings. For instance, conventional devices utilize designs that make it difficult to transport, and difficult to clean and maintain. Additionally, some conventional devices utilize designs that make it difficult for a pet to properly use, e.g., the pet may have its front paws on and its rear paws off of the device, which may result in the pet going to the bathroom on a finished surface of an interior of a house.

Thus, there is a need for pet potty system that does not suffer from the shortcomings of conventional devices, e.g., is easy to transport, and easy to clean and maintain.

SUMMARY OF THE INVENTION

The present inventive concept remedies the aforementioned problems associated with indoor pets and conventional pet potties. The present inventive concept provides a reconfigurable pet potty system that is selectively configurable between use and storage configurations. In the use configuration, the system is operable to be used as a toilet by a pet. In the storage configuration, the system is collapsed, with its footprint minimized, thereby facilitating transport and/or storage of the system. The system includes a plurality of different types of joints including a pivot joint that is operable to automatically lock the system in either of the configurations to prevent unintentional transformations of the system between the different configurations.

The aforementioned may be achieved in one aspect of the present inventive concept by providing a reconfigurable pet potty system. The system may include a plurality of frames that may be secured together via a plurality of joints. Each of the frames may be defined by a plurality of elongated frame members. Each of the frames may be selectively pivotable with respect to another one or more of the frames. Each of the frame members may define an interior void. The voids may include a sheet removably secured therein. The plurality of frames may include a base frame secured between opposing wall frames. The plurality of frames may be selectively reconfigurable between a use configuration and a storage configuration.

In the use configuration, the wall frames may extend substantially perpendicular to the base frame. In the storage configuration, the wall frames may extend substantially parallel to the base frame. The plurality of joints may include pivot joints and/or fixed joints. The pivot joints may be operable to allow the wall frames to pivot relative to the base frame. The fixed joints may secure frame members connected thereto in a fixed position relative to each other.

Each of the pivot joints may include a locking mechanism operable to only allow pivoting of the wall frames relative to the base frame while the mechanism is actuated. The locking mechanism may be operable to be actuated by simultaneously (i) depressing a resilient button of the locking mechanism, and/or (ii) pivoting a corresponding one of the wall frames.

The locking mechanism may include a hub that protrudes from a disk having a plurality of apertures extending at least partially therethrough. The apertures may be spaced around a circumference of the disk to define locking points. The locking points may define a pivot range of the wall frames relative to the base frame. The resilient button may include a plurality of posts operable to be removably and at least partially received within the plurality of apertures to cause the wall frames to be secured relative to the base frame. The pivot range between the locking points may be ninety degrees. The two frame members of the base frame may each include a center joint to allow the two frame members to pivot relative to each other.

The aforementioned may be achieved in one aspect of the present inventive concept by providing a method of manufacturing a reconfigurable pet potty system. The method may include the step of securing a plurality of frames together via joints. Each of the frames may be defined by a plurality of elongated frame members. Each of the frames may be selectively pivotable with respect to another one or more of the frames. Each of the frame members may define an interior void. The voids may include a sheet removably secured therein.

Other systems, methods, features, and advantages of the present inventive concept will be or will become apparent to one with skill in the art upon examination of the following figures and detailed description. It is intended that all such additional systems, methods, features, and advantages be included within this description, be within the scope of the present inventive concept, and be protected by the accompanying claims.

BRIEF DESCRIPTION OF THE DRAWINGS

The accompanying figures, which are incorporated in and constitute a part of this specification, illustrate an implementation of the present inventive concept and, together with the description, serve to explain the advantages and principles of the present inventive concept. In the figures.

The figures do not limit the present inventive concept to the specific examples disclosed and described herein, and are not necessarily to scale.

DETAILED DESCRIPTION OF THE INVENTION

The following detailed description references the accompanying figures that illustrate the present inventive concept. The illustrations and description are intended to describe aspects of the present inventive concept in sufficient detail to enable those skilled in the art to practice the present inventive concept. Other components can be utilized and changes can be made without departing from the scope of the present inventive concept. The following detailed description is, therefore, not to be taken in a limiting sense. The scope of the present inventive concept is defined only by the appended claims, along with the full scope of equivalents to which such claims are entitled.

In this description, references to an "embodiment" or "embodiments" mean that the feature or features being referred to are included in at least one embodiment of the present inventive concept. Separate references to an "embodiment" or "embodiments" do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present inventive concept can include a variety of combinations and/or integrations of the embodiments described herein.

Figure 1:
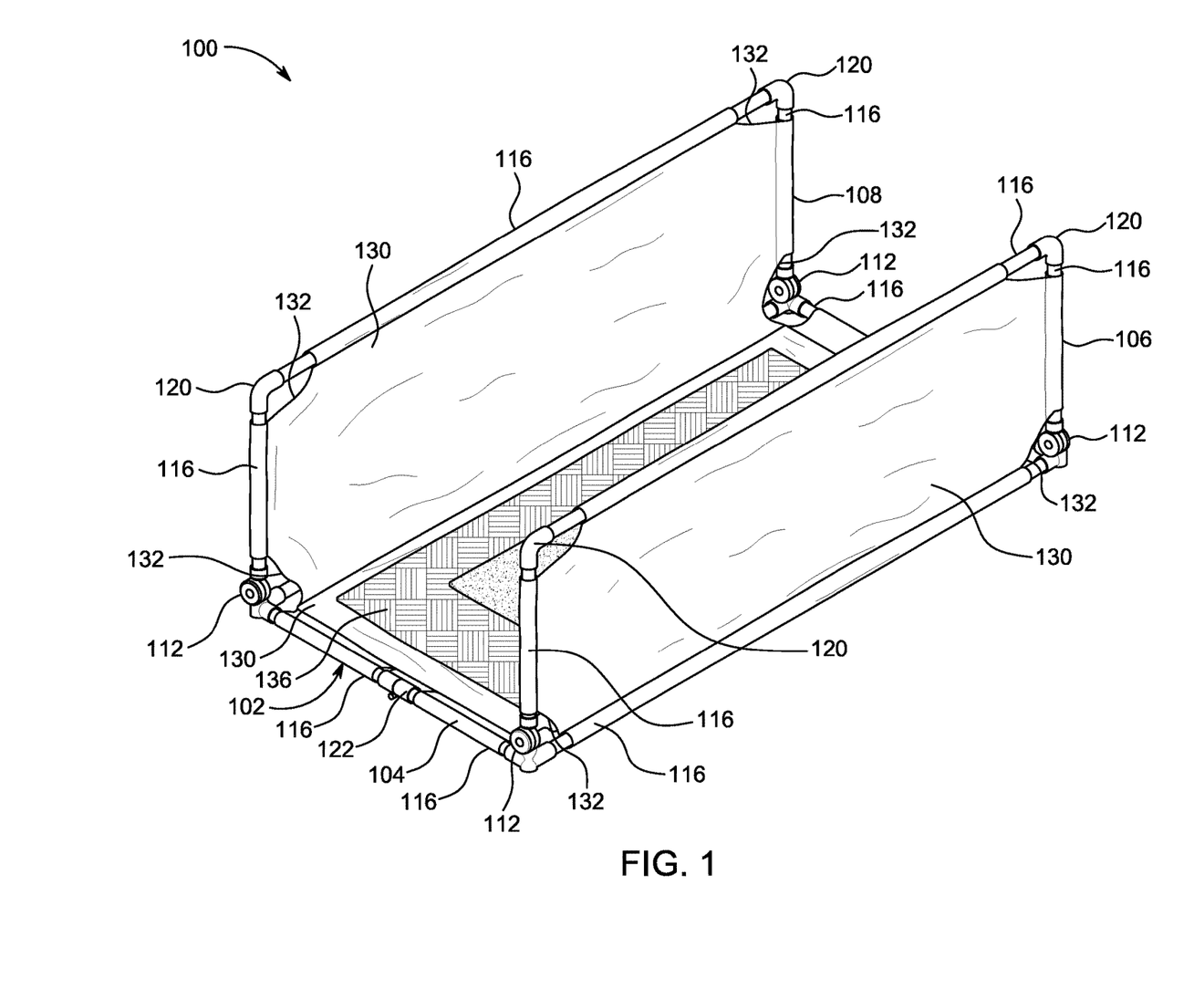
FIG. 1 is a front, left side perspective view of a reconfigurable pet potty system in a use configuration in accordance with the present inventive concept.
Figure 2:
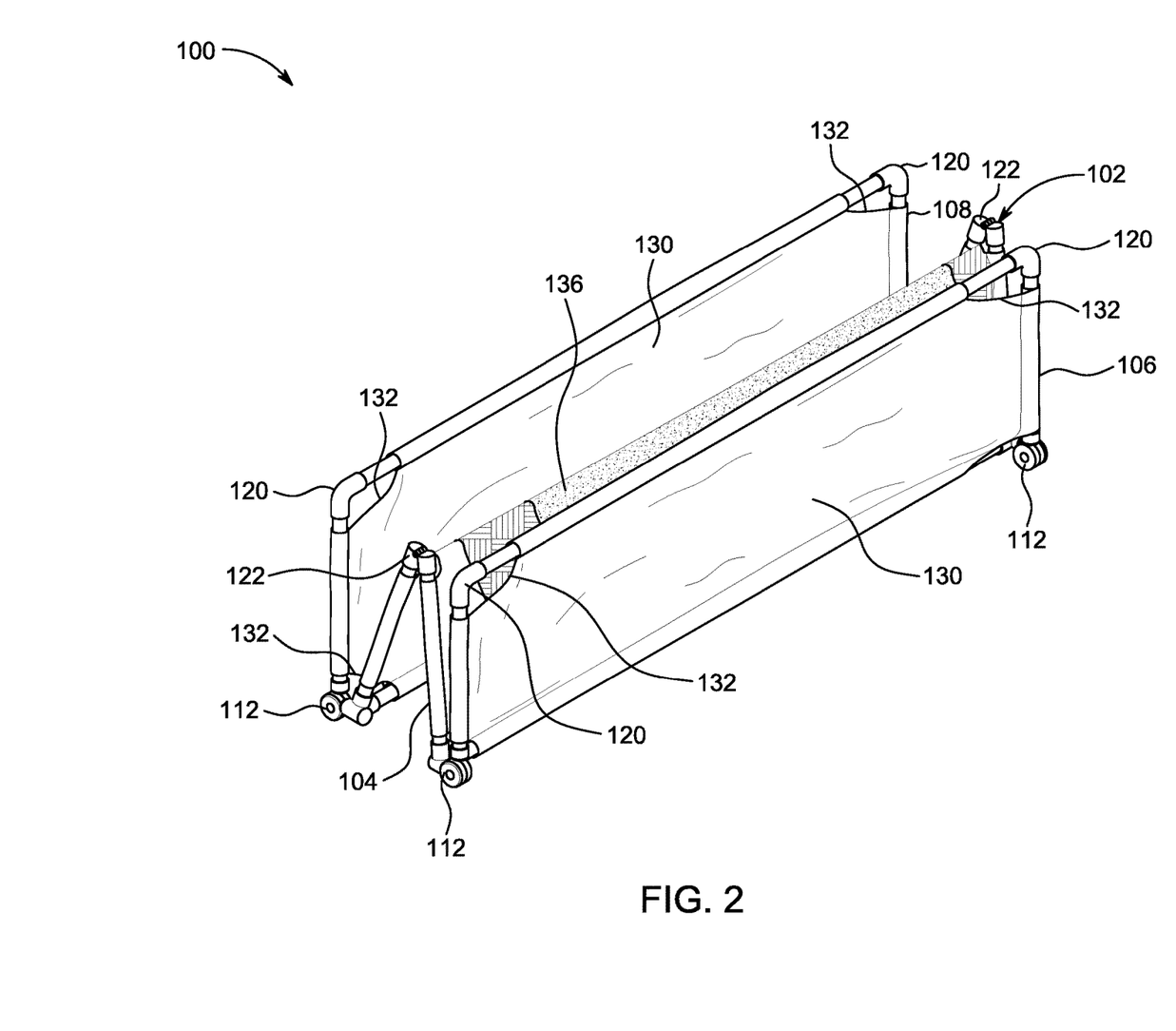
FIG. 2 is a front, left side perspective view of the reconfigurable pet potty system of FIG. 1 in a storage configuration.
Figure 3:
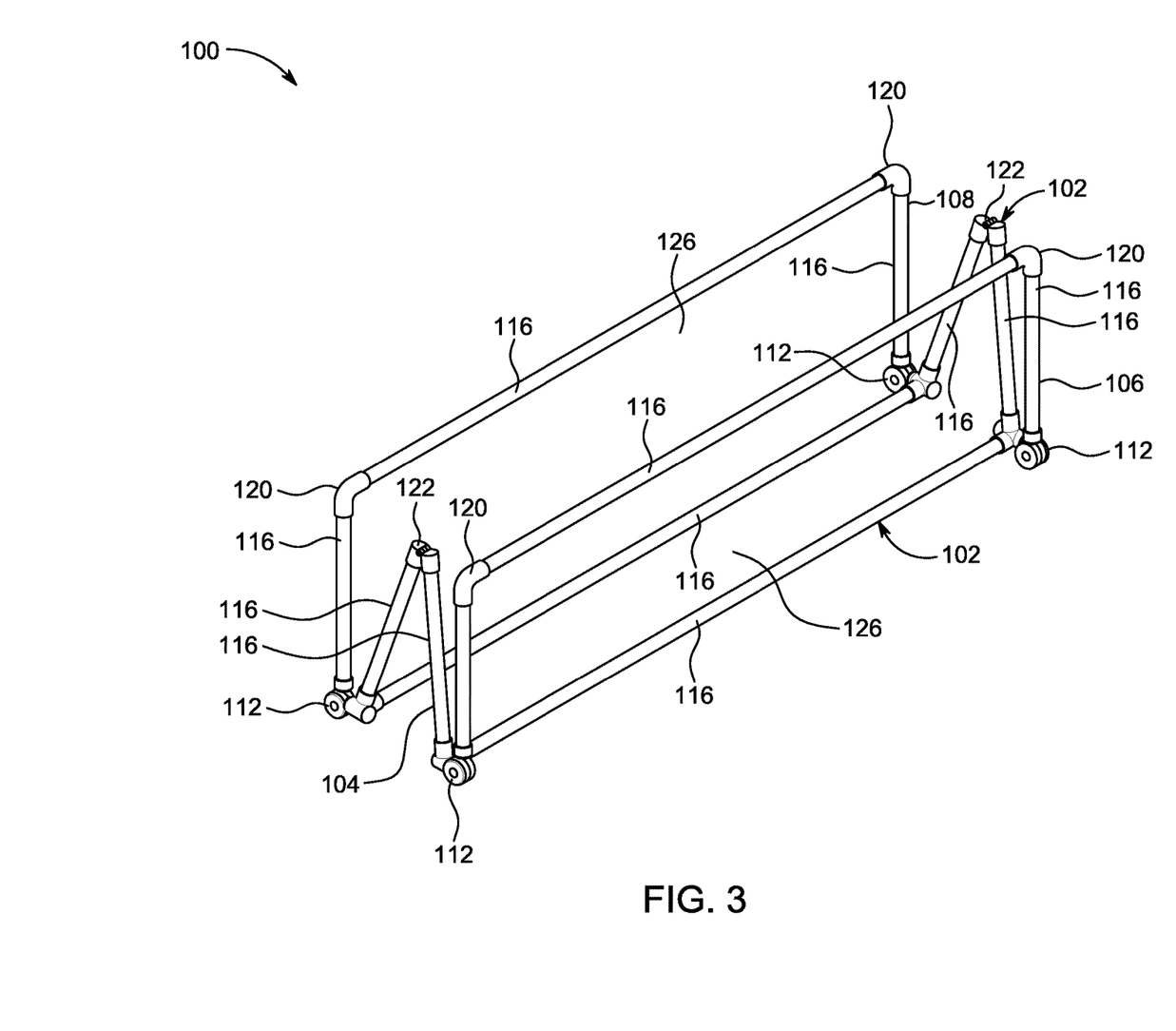
FIG. 3 is a front, left side perspective view of the reconfigurable pet potty system of FIG. 1 in a storage configuration.

Referring now to FIGS. 1 and 2, a preferred embodiment of a reconfigurable pet potty system 100 is illustrated. In the presently preferred embodiment, the pet potty system 100 includes a housing 102 having a plurality of frames, i.e., a first frame or base frame 104, which is secured between opposing second and third frames or wall frames 106, 108. In the preferred embodiment, each of the frames 104, 106, 108 is rectangular and made of plastic, but it is foreseen that any one or more of the frames 104, 106, 108 may be made in any shape, e.g., circular, square, oval, or the like, and made of any material, e.g., metal, glass, wood, and/or a combination of plastic, metal, glass, and/or wood, without deviating from the scope of the present inventive concept.

Each of the frames 104, 106, 108 is secured together via a plurality of pivot joints 112 to allow each of the frames 104, 106, 108 to independently pivot with respect to one of the other frames 104, 106, 108. Specifically, each of the frames 106, 108 is directly independently pivotable with respect to the frame 104 via the joints 112, and indirectly independently pivotable with respect to each other, i.e., frames 106, 108) through the frame 104 via the joints 112, which are further discussed hereafter. It is foreseen that each of the wall frames 106, 108 may be secured to the base frame 104 in a fixed position, e.g., at a ninety degree angle, without deviating from the scope of the present inventive concept. It is also foreseen that one or both of the wall frames 106, 108 may be completely removed from the base frame 104, with the base frame 104 operable for use without one or both of the wall frames 106, 108, without deviating from the scope of the present inventive concept.

Turning to FIGS. 3-9, each of the frames 104, 106, 108 has a structure defined by a plurality of elongated, tubular frame members 116. Each of the frame members 116 is secured together by at least one of the pivot joints 112, a fixed joint 120, and/or an intermediary pivot joint 122. The fixed joint 120 is an elbow or "L" shaped joint.

The frame members 116 of each of the frames 104, 106, 108 define an interior void 126. Each of the interior voids 126 is operable to removably receive a portion of a sheet 130. In the exemplary embodiment, the sheet 130 has an upper layer made of a single unified piece of rectangular fibrous material, e.g., cloth. It is foreseen, however, that the sheet 130 may include a plurality of separate pieces of material, e.g., a separate sheet for each of the frames 104, 106, 108, may be made of same or different materials, e.g., one or more types of plastics, and/or may be made in any shape, without deviating from the scope of the present inventive concept. The sheet 130 is sized and shaped to slidably receive each of the frame members 116 along each side of the sheet 130 during assembly of the system 100. The sheet 130 conforms to a shape defined by each of the frame members 116 of each of the frames 104, 106, 108, upon assembly of the frame members 116, as illustrated by FIGS. 1 and 2. When the frame members 116 are fully assembled, the frame members 116 maintain the sheet 130 in a stretched or taut configuration so that the sheet 130 substantially fills an entirety of each of the interior voids 126. In the exemplary embodiment, the sheet 130 includes cutout portions 132 to facilitate installation and removal of the sheet 130, e.g., for cleaning or replacement of the sheet 130, and to accommodate reconfigurations of the system 100, which is further discussed hereafter.

A center portion of the sheet 130 includes an absorbent pad 136, which is made of a material that is impenetrable by liquid to prevent liquid from penetrating through the absorbent pad 136 and onto a surface beneath the absorbent pad 136. When the sheet 130 is installed on the system 100, the frame members 116 cause the absorbent pad 136 to be oriented substantially within the interior void 126 defined by the base frame 104. In the exemplary embodiment, the absorbent pad 136 includes an upper layer made of a piece of rectangular fibrous material, e.g., cloth, and a lower layer made of a piece of rectangular material that is impenetrable by liquid, e.g., plastic. It is foreseen, however, that the absorbent pad 136 may be made of other materials or combinations thereof, and/or made of any shape, without deviating from the scope of the present inventive concept.

Figure 10:
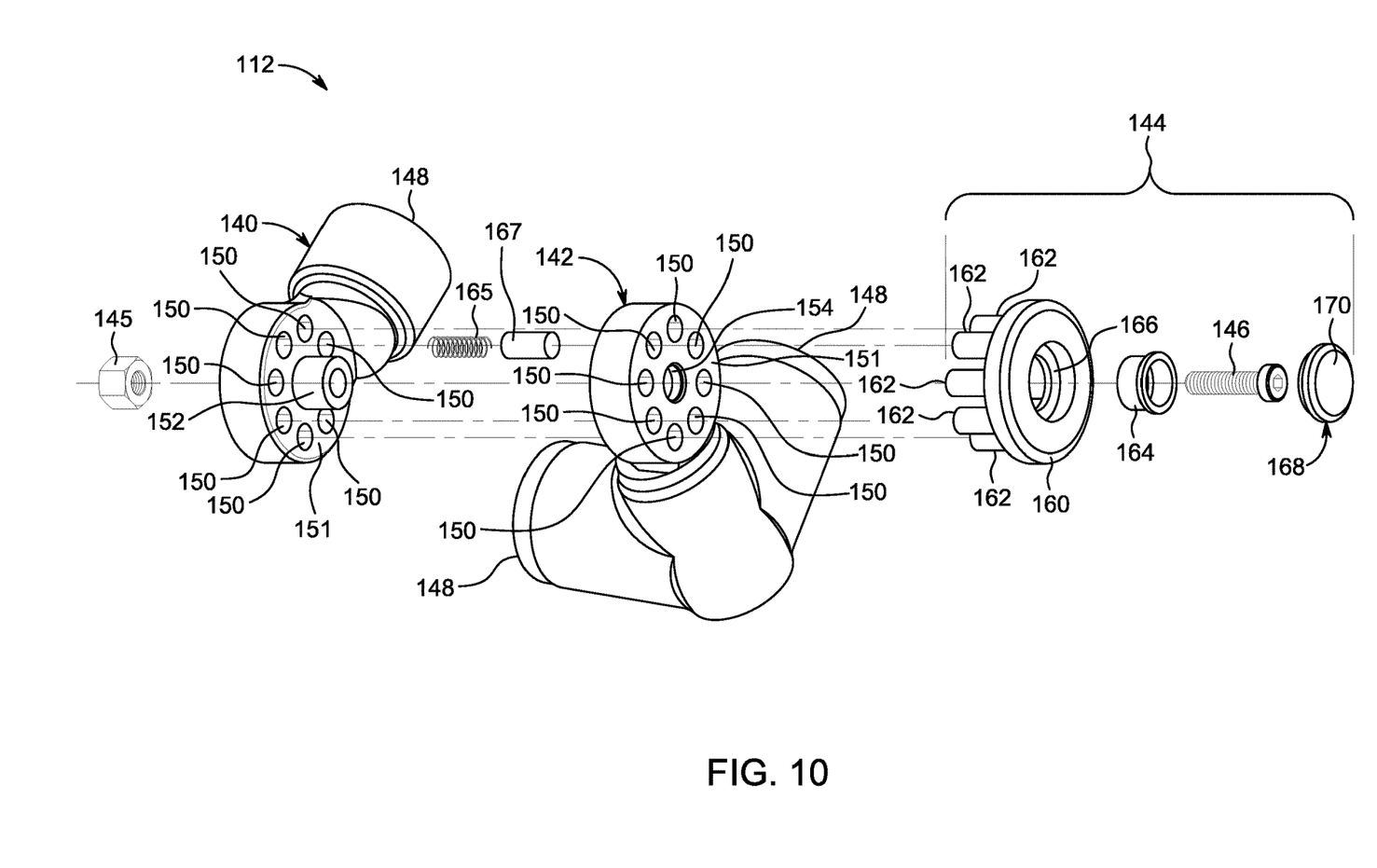
FIG. 10 is an exploded perspective view of a pivot joint of the reconfigurable pet potty system of FIG. 1.
Figure 11:
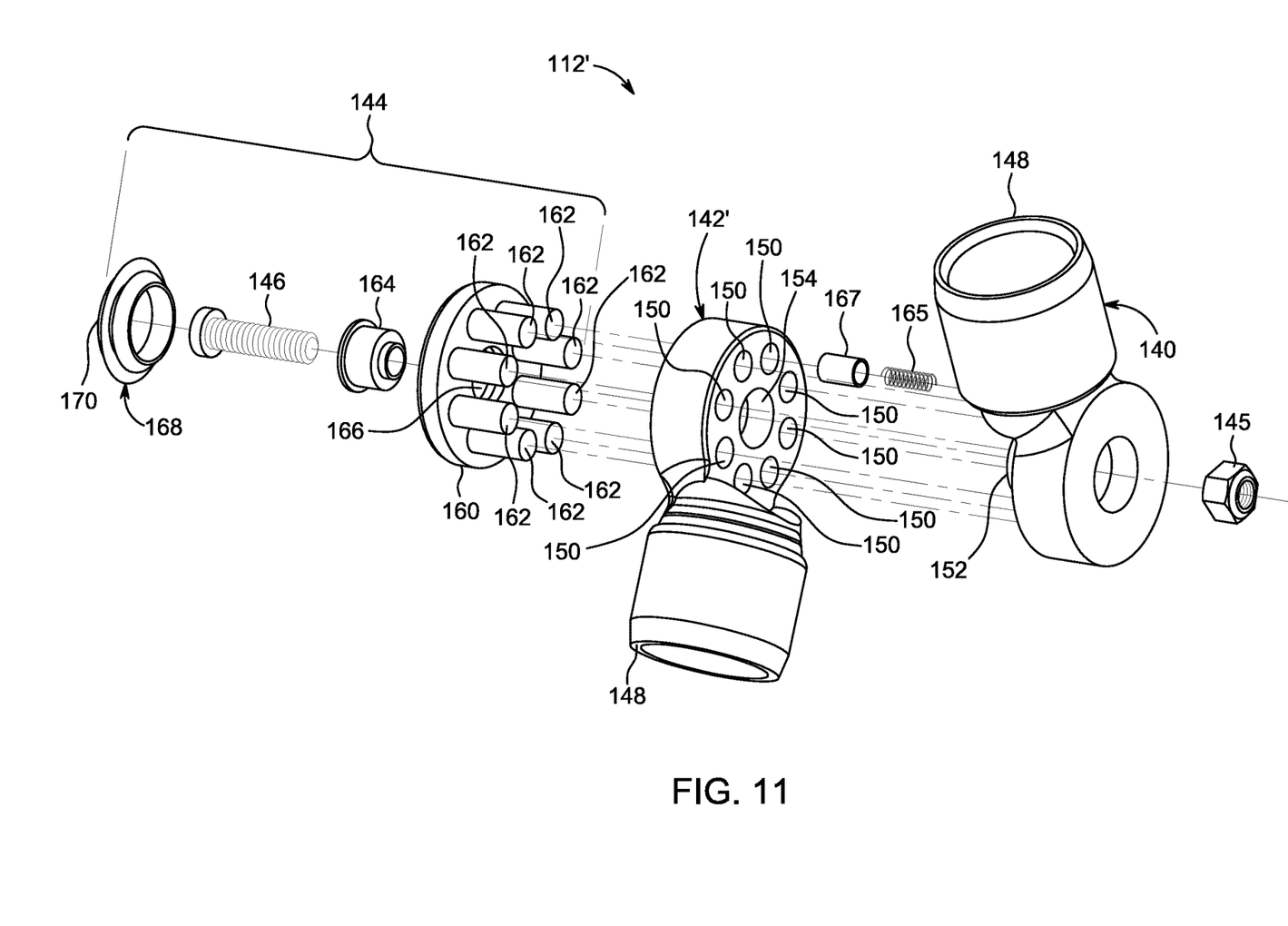
FIG. 11 is an exploded perspective view of a pivot joint of the reconfigurable pet potty system of FIG. 1.

Turning to FIGS. 10 and 11, each of the joint 112 and alternate joint 112' includes a male receiver 140, a female receiver 142 or female receiver 142', and a locking mechanism 144 that are connected via a nut 145 and a bolt 146. Each of the receivers 140, 142, 142' include one or more receiver portions 148 that is operable to securely receive an end of one of the frame members 116. In the preferred embodiment, each of the receiver portions 148 are sized and shaped to engage the end of one of the frame members 116 via a friction-fit engagement without any adhesive, thereby allowing disassembly of the system 100, e.g., for installation and/or removal of the sheet 130. It is foreseen, however, that the frame members 116 may be permanently secured within the receiver portions 148 via an adhesive, thereby forming an adhesive bond therebetween and preventing complete disassembly of the system 100, without deviating from the scope of the present inventive concept. As illustrated by FIG. 11, the female receiver 142' of the joint 112' has a single one of the one or more receiver portions 148 and, therefore, is operable to only accommodate a single one of the frame members 116.

Each of the receivers 140, 142, 142' includes a plurality of apertures 150 circumferentially arranged in identical patterns about a disk 151 of each of the receivers 140, 142, 142'. The apertures 150 define a circumferential perimeter on each of the receivers 140, 142, 142'. Each of the apertures 150 extends at least partially through its respective one of the receivers 140, 142, 142'. The present inventive concept includes at least four apertures, preferably at least six apertures, and most preferably eight apertures 150, with each of the apertures 150 extending entirely through the female receiver 142, 142' and only partially through the male receiver 140. It is foreseen, however, that there may be fewer or more of the apertures 150 and/or one or more of the apertures 150 may extend entirely through each of the receivers 140, 142, 142' without deviating from the scope of the present inventive concept.

The male receiver 140 includes a hub 152, which protrudes from a surface of the disk 151 at a center of the perimeter defined by the apertures 150 of the male receiver 140. The hub 152 is sized and shaped to be at least partially received within an orifice 154 of the female receiver 142, 142', such that the hub 152 is operable to nest within the orifice 154 of the female receiver 142, 142'. The hub 152 and the orifice 154 form a rotatable connection therebetween. In this manner, the female receiver 142, 142' is operable to rotate or pivot about the male receiver 140 via the rotatable connection formed by the hub 152 and the orifice 154. When the system 100 is fully assembled, pivoting of the joints 112, 112' causes the frames 106, 108 to pivot relative to the frame 104.

The identical pattern of the apertures 150 causes each of the apertures 150 of the male receiver 140 to become aligned with at least one of the apertures 150 of the female receiver 142, 142' when the receivers 140, 142, 142' are pivoted with respect to each other. The receivers 140, 142, 142' define a maximum range of pivot in either direction of the joints 112, 112', with the receiver 142 defining a smaller range of pivot relative to the receiver 142', which defines a larger range of pivot. In the preferred embodiment, each of the apertures 150 of the male receiver 140 are operable to align with a plurality of different apertures 150 of the female receiver 142, 142', at a plurality of different points along the pivot range, e.g., five of the apertures 150 at five points via the receiver 142, and seven of the apertures 150 at seven points via the receiver 142', when the receiver 140 is pivoted with respect to the receiver 142 or the receiver 142', as is further discussed hereafter.

The locking mechanism 144 includes a button 160 with a plurality of posts 162, i.e., at least four posts, preferably at least six posts, and most preferably eight posts, protruding from a rear surface thereof. Each of the plurality of posts 162 are sized and shaped to be slidably received by one of the apertures 150 of the female receiver 142, 142' and one of the apertures 150 of the male receiver 140, in this order. In the preferred embodiment, each of the plurality of posts 162 is operable to extend entirely through one of the apertures 150 of the female receiver 142, 142' and partially through one of the apertures 150 of the male receiver 140. It is foreseen, however, that each of the plurality of posts 162 may be designed to extend partially through one of the apertures 150 of the female receiver 142, 142' and entirely through one of the apertures 150 of the male receiver 140, and/or be initially received by the male receiver 140 and subsequently received by the female receiver 142, 142', without deviating from the scope of the present inventive concept.

The button 160 includes a positioning element 164 that is concealed by a cap 168, when the locking mechanism 144 is fully assembled. The positioning element 164 has a collar extension on a tip thereof such that, when the positioning element 164 is secured within an orifice 166 of the button 160, the collar extension extends through the orifice and abuts the hub 152, thereby causing the positioning element 164 to facilitate positioning of the button 160 with respect to the receivers 140, 142, 142', and alignment of the posts 162 with the apertures 150 of the receivers 140, 142, 142'.

A biasing assembly, i.e., a spring 165 partially received within and at least partially supported by a sleeve 167, is secured between the receivers 140, 142, 142', with either end of the biasing assembly at least partially installed within adjacent ones of the apertures 150 of the receivers 140, 142, 142'. In this manner, the spring 167 abuts an internal wall of a corresponding one of the apertures 150 of the female receiver 142, 142', and the spring 165 abuts an internal wall of a corresponding one of the apertures 150 of the male receiver 140. Thus, the biasing assembly is trapped between the receivers 140, 142, 142', and is operable to maintain the receivers 140, 142, 142' in a fixed position relative to each other or locked, when no force is applied to the button 160, i.e., the button is not actuated. The biasing assembly operates in coordination with the button 160 and the receivers 140, 142, 142' such that, when the cap 168 is secured within the orifice 166 of the button 160, the cap 168 provides a planar top surface 170 to facilitate actuation of the button 160 in coordination with the biasing assembly. When the button 160 is actuated, i.e., by applying a force to the button 160 or depressing the button 160, the biasing function of the biasing assembly is overcome, which causes the posts 162 to laterally move along and push the biasing assembly completely out of the apertures 150 of the female receiver 142, 142' and substantially into the apertures 150 of the male receiver 140, with the posts 162 completely filling each of apertures 150 of the female receiver 142, 142', thereby providing a planar surface, in combination with an outermost surface of the female receiver 142, 142'. Via the planar surface, the receivers 140, 142, 142' are operable to pivot with respect to each other until the button 160 is no longer actuated, e.g., the button 160 is released. In this manner, actuation of the button 160 causes each of the joints 112, 112' to be unlocked so that they system 100 can be reconfigured, i.e., to and from a use configuration and a storage configuration, as illustrated by FIGS. 1 and 2, respectively. With each of the joints 112, 112' unlocked, the frames 104, 106, 108 are operable to pivot with respect thereto. Specifically, the frames 104, 106, 108 are operable to pivot with respect to each other by simultaneously applying the force to the button 160 and pivoting the joints 112, 112', e.g., by applying one or more additional forces to a portion of each of the joints 112, 112' and/or a portion of each of the frames 104, 106, 108. When the force is removed from the button 160, i.e., the button 160 is released, the biasing function of the biasing assembly causes the posts 162 to move toward the apertures 150 of the male receiver 140. If the apertures 150 of the male receiver 140 are not aligned with the apertures 150 of the female receiver 142, 142', e.g., because the receivers 140, 142, 142' have been pivoted to a point where the apertures 150 of the male receiver 140 and are not aligned, the posts 162 abut a surface of the disk 151. In such a scenario, the receivers 140, 142, 142' remain operable to pivot until the apertures 150 are aligned, at which point the posts 162 are received within the apertures 150 of the male receiver 140 and the receivers 140, 142, 142' are no longer operable to pivot, i.e., the joints 112, 112' are automatically locked. Alternatively, if the apertures 150 of the male receiver 140 are aligned with the apertures 150 of the female receiver 142, 142' when the button 160 is released, the posts 162 are immediately received within the apertures 150 of the male receiver 140 and the receivers 140, 142, 142' are no longer operable to pivot, i.e., the joints 112, 112' are automatically locked.

Figure 4:
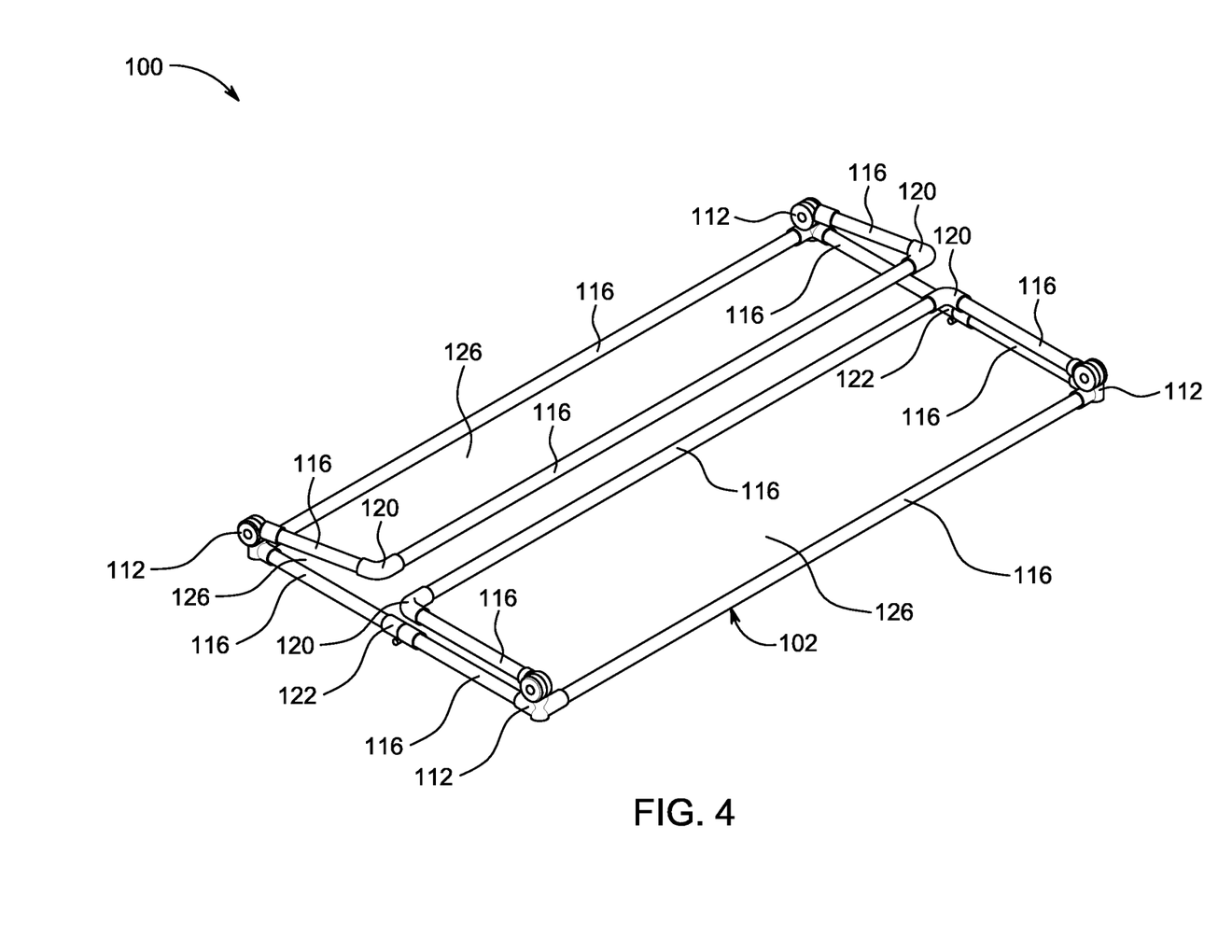
FIG. 4 is a front, left side perspective view of the reconfigurable pet potty system of FIG. 1 partially reconfigured and between a use configuration and a storage configuration.
Figure 5:
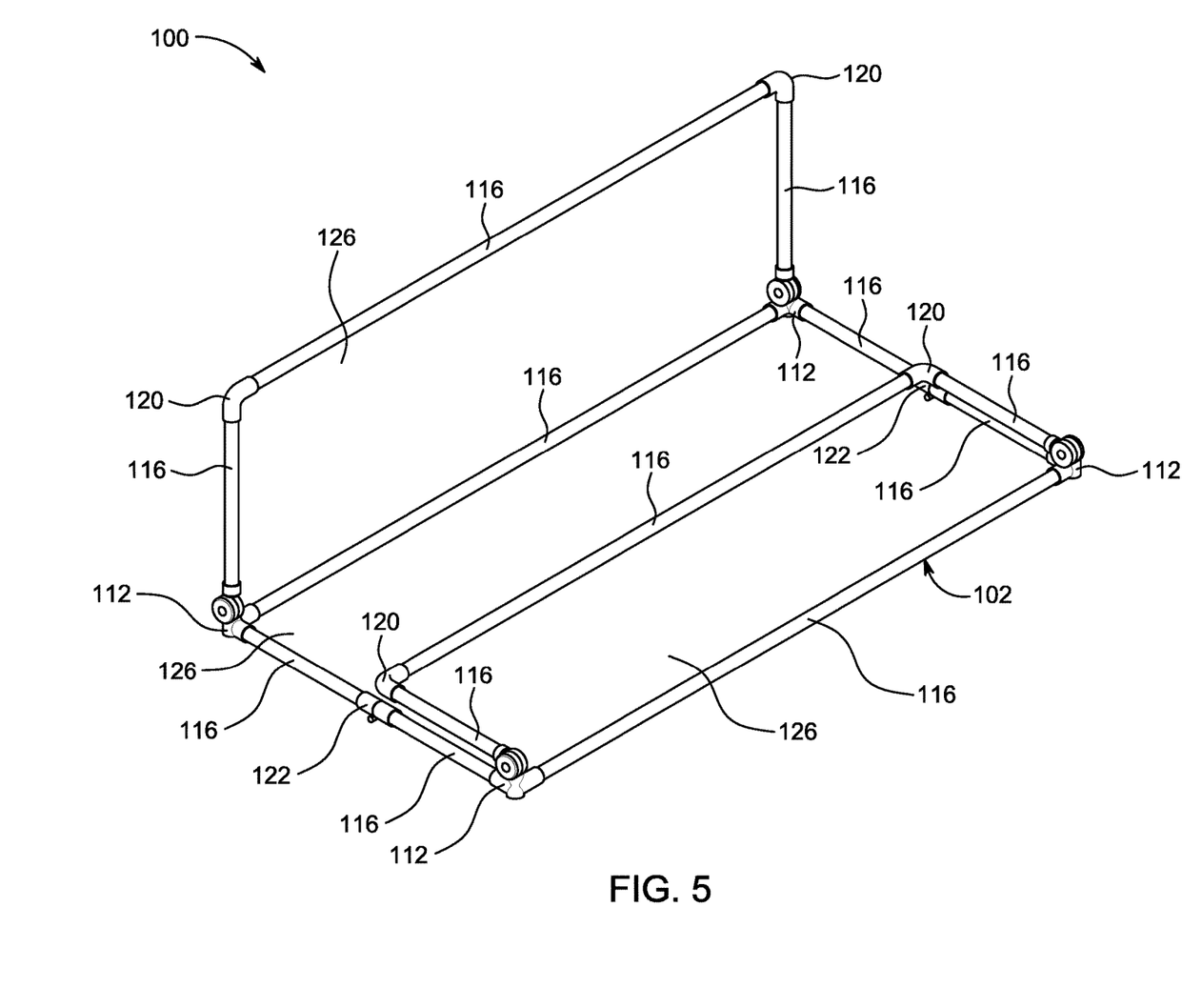
FIG. 5 is a front, left side perspective view of the reconfigurable pet potty system of FIG. 1 partially reconfigured and between a use configuration and a storage configuration.
Figure 6:
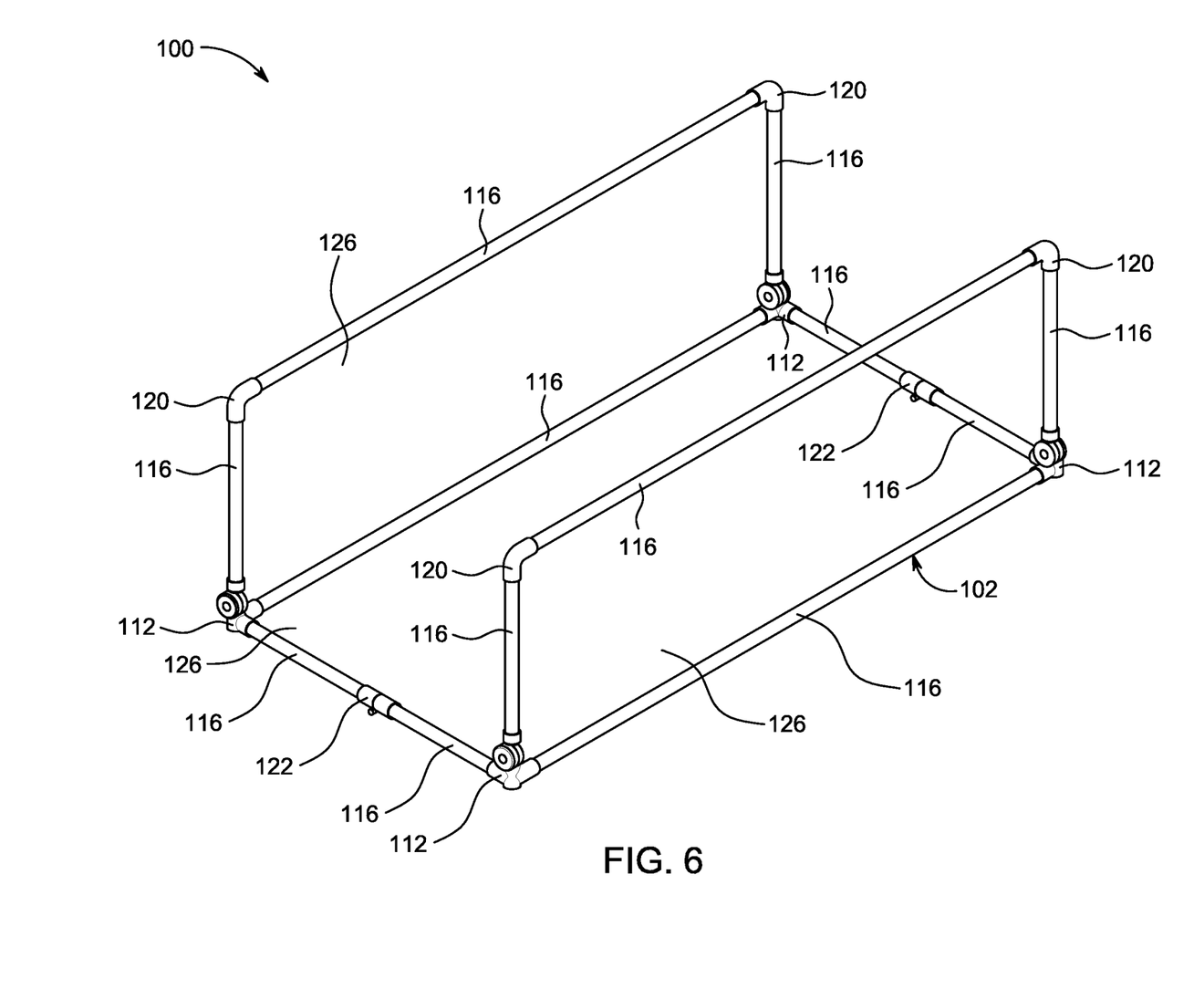
FIG. 6 is a front, left side perspective view of the reconfigurable pet potty system of FIG. 1 in a use configuration.
Figure 7:
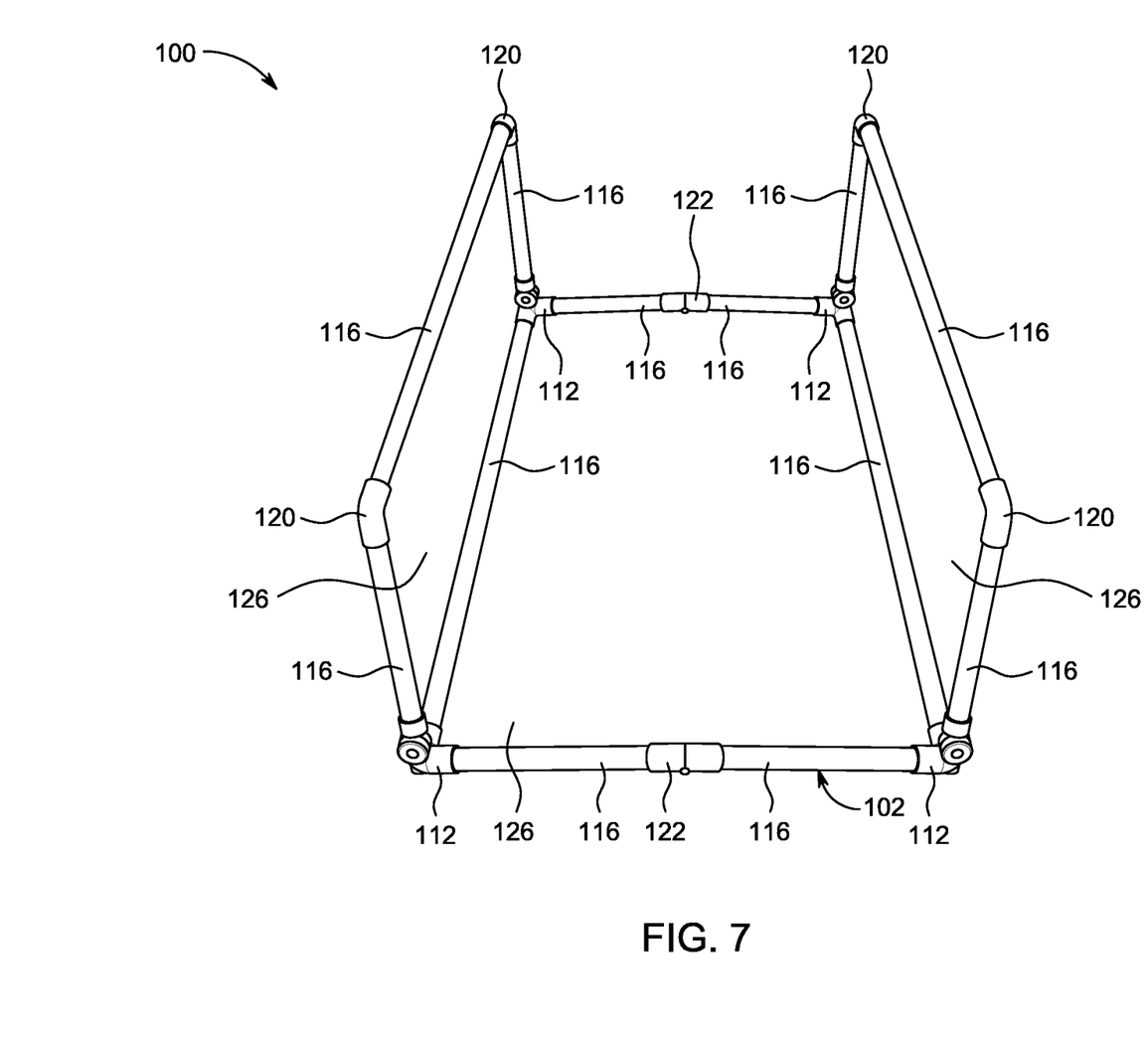
FIG. 7 is a front perspective view of the reconfigurable pet potty system of FIG. 1 in a use configuration.
Figure 8:
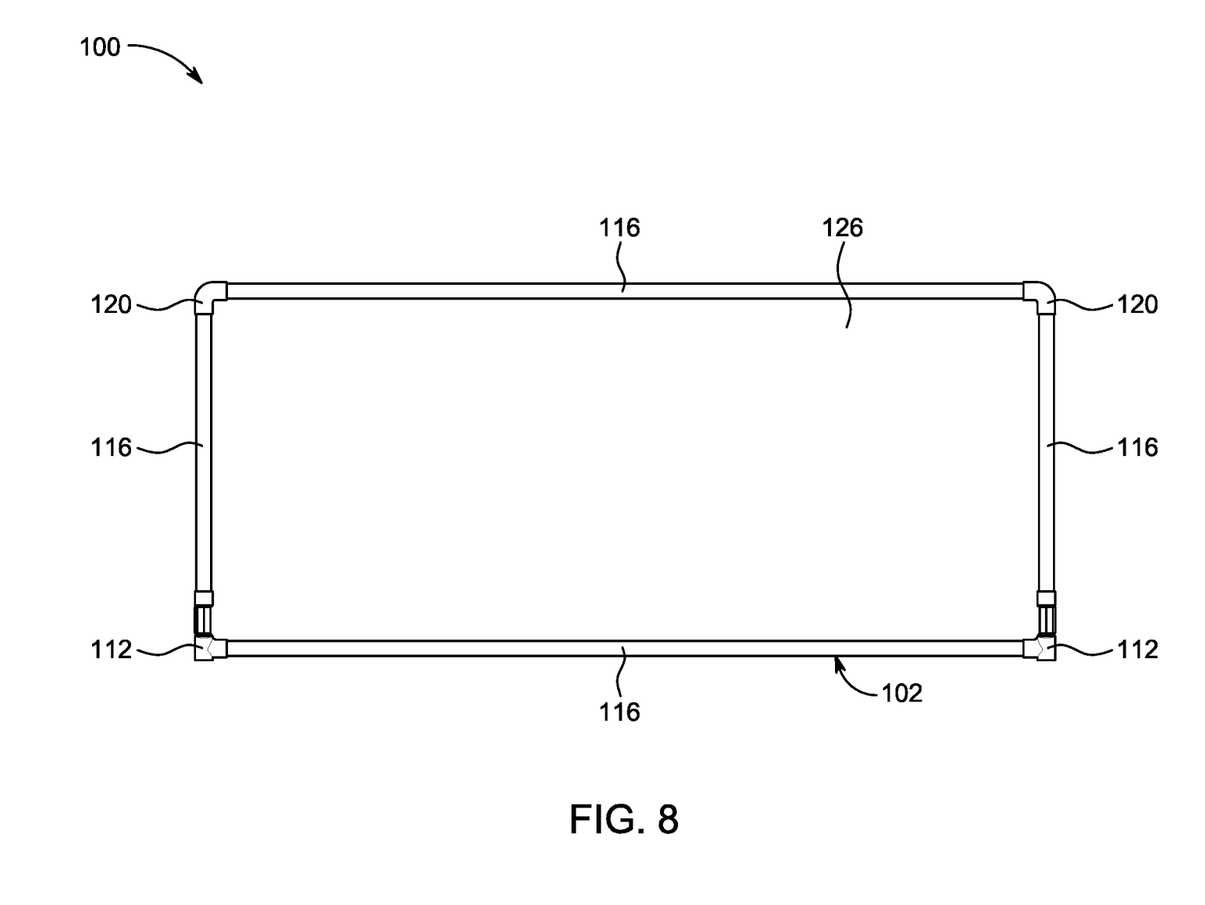
FIG. 8 is an elevated left side view of the reconfigurable pet potty system of FIG. 1 in a use configuration.
Figure 9:
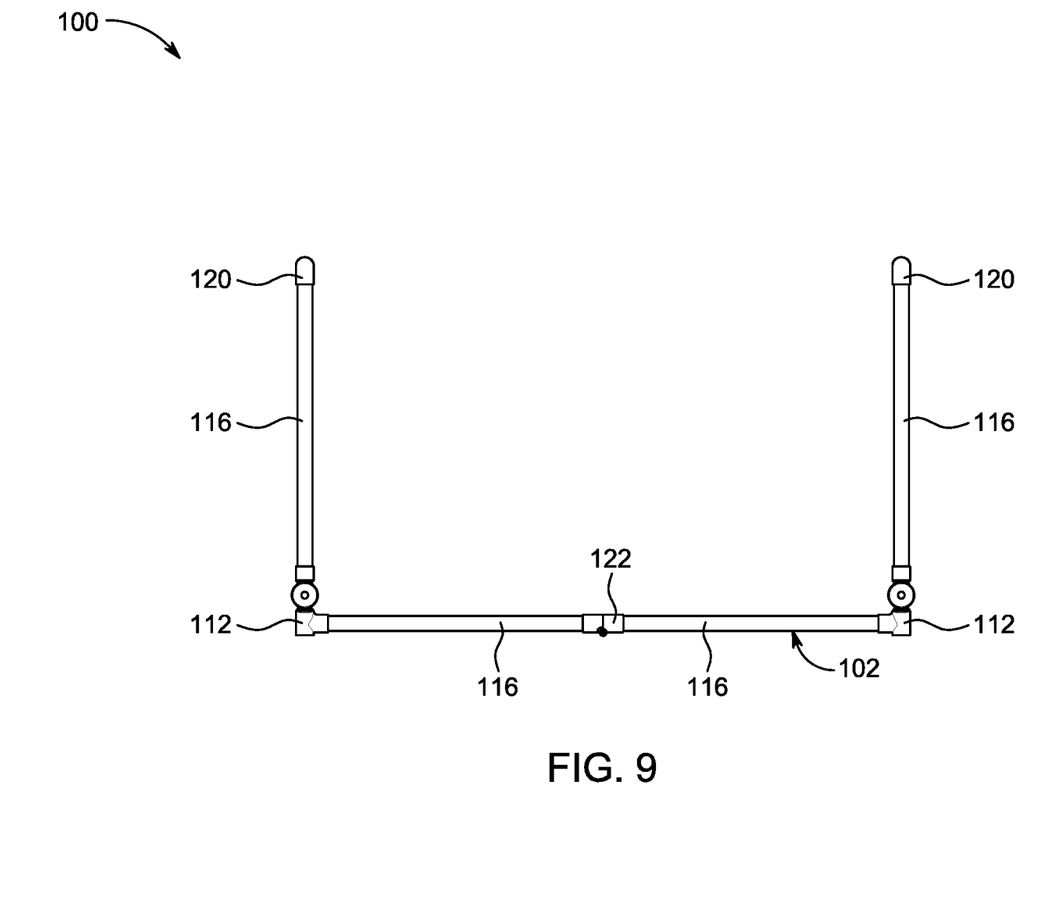
FIG. 9 is an elevated front view of the reconfigurable pet potty system of FIG. 1 in a use configuration.

The identical patterns of the apertures 150 define a plurality of locking points, i.e., three locking points, and a pivot range of the frames 104, 106, 108 relative to each other. In the preferred embodiment, the locking points allow each of the frames 106, 108 to be pivoted and locked in configurations that are ninety degrees relative to each other and/or the frame 104, i.e., with the frames 106, 108 extending toward and parallel to the frame 104 as illustrated by FIG. 4, extending perpendicular to the frame 104 as illustrated by FIG. 6, and extending away from and parallel to the frame 104. The receiver portions 148 provide an obstruction, which prevents a complete revolution of the receivers 140, 142, 142', thereby defining a pivot range. It is foreseen that additional locking points can be added to change the pattern of the apertures 150, e.g., by adding additional apertures, without deviating from the scope of the present inventive concept.

Figure 12:
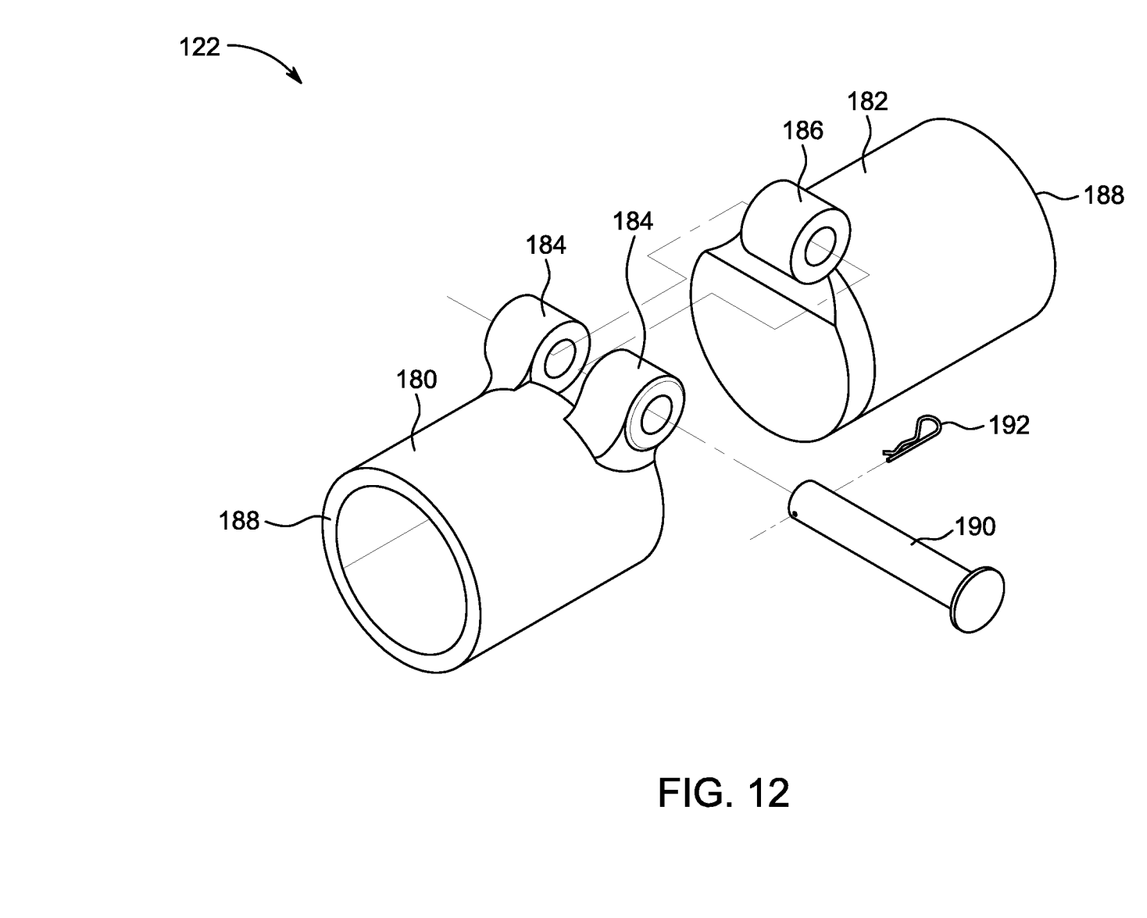
FIG. 12 is an exploded perspective view of an intermediary pivot joint of the reconfigurable pet potty system of FIG. 1.

Turning to FIG. 12, each of the intermediary pivot joint 122 includes first and second components 180, 182, and cooperative hinge components 184, 186. Each of the components 180, 182 include a receiver portion 188 that is operable to securely receive an end of one of the frame members 116. In the preferred embodiment, each of the receiver portions 188 are sized and shaped to engage the end of one of the frame members 116 via a friction-fit engagement without any adhesive, thereby allowing disassembly of the system 100, e.g., for installation and/or removal of the sheet 130. It is foreseen, however, that the frame members 116 may be permanently secured within the receiver portions 188 via an adhesive, thereby forming an adhesive bond therebetween and preventing complete disassembly of the system 100, without deviating from the scope of the present inventive concept.

The hinge components 184, 186 are operable to receive a bolt 190 therethrough. When the bolt 190 is installed through the hinge components 184, 186, the bolt 190 allows the components 180, 182 to pivot with respect to each other via the joint 122, e.g., to and from a parallel configuration, as illustrated by FIG. 1 and a non-parallel configuration, as illustrated by FIG. 2. The bolt 190 is operable to receive a resilient pin 192 therethrough, adjacent to an end thereof to prevent inadvertent removal of the bolt 190 from the hinge components 184, 186. It is foreseen that a roll pin, a cotter pin, or the like, can be used instead of the bolt 190, which does not require any additional components, e.g., a pin, to maintain its position within the hinge components 184, 186 without deviating from the scope of the present inventive concept.

By actuating the locking mechanism 144 of each of the joints 112, 112', the system 100 can be selectively converted or reconfigured to and from a use configuration, as illustrated by FIG. 1, and a collapsed storage configuration, as illustrated by FIG. 2. In the use configuration, the pad 130 is oriented within the base frame 104 to be adjacent to a finished surface, on carpet, of an interior of a residence. Further, in the use configuration the wall frames 106, 108 are oriented via the joint 112 to extend ninety degrees from the base frame 104, i.e., a plane defined by the wall frames 106, 108 extend substantially perpendicular to a plane defined by the base frame 104, thereby providing walls to confine a pet within the system 100, i.e., directly over the pad 130. In other words, the wall frames 106, 108 are operable to guide the pet over the pad 130 and confine the pet within a space defined by and between the walls frames 106, 108, while the pet urinates on the pad 130. In this manner, the system 100 is operable for use by the pet as a toilet, while protecting the interior of the residence. In the storage configuration, the wall frames 106, 108 are oriented by the joint 112 to extend substantially parallel to the base frame 104. Additionally, the joint 122 allows the base frame 104 to fold or collapse. In this manner, the joints 112, 122 cooperatively cause a footprint of the system 100 to be minimized so that transport and/or storage of the system 100 can be facilitated. It is foreseen that the present inventive concept may be designed to be only partially collapsible by replacing the joint 122 with a single, longer tubular member 104 that connects adjacent ones of the joints 112, without deviating from the scope of the present inventive concept.

Having now described the features, discoveries, and principles of the present disclosure, the manner in which embodiment of the present disclosure are constructed and used, the characteristics of the construction, and advantageous, new and useful results obtained; the new and useful structures, devices, elements, arrangements, parts and combinations, are set forth in the appended claims.

The following claims are intended to cover all of the generic and specific features of the present disclosure herein described, and all statements of the scope of the present inventive concept, which, as a matter of language, might be said to fall there between.

What is claimed is:
1. A reconfigurable pet potty system comprising:
a plurality of frames secured together via a plurality of joints including pivot joints, each of the plurality of frames (i) defined by a plurality of elongated frame members, and (ii) selectively pivotable with respect to another one or more of the frames,
wherein,
each of the plurality of frames define one of a plurality of interior voids,
each of the plurality of interior voids includes a sheet removably secured therein, and each of the pivot joints includes a locking mechanism (i) having a plurality of locking points, and (ii) operable to allow pivoting of at least one of the plurality of frames between the plurality of locking points when the locking mechanism is actuated.

2. The system of claim 1,
wherein,
the plurality of frames includes a base frame secured between opposing wall frames, and
the plurality of frames are selectively reconfigurable between a use configuration and a storage configuration.

3. The system of claim 2,
wherein,
in the use configuration, the wall frames extend substantially perpendicular to the base frame, and
in the storage configuration, the wall frames extend substantially parallel to the base frame.

4. The system of claim 2,
wherein,
the plurality of joints further include fixed joints,
the pivot joints are operable to allow the wall frames to pivot relative to the base frame, and
the fixed joints secure the plurality of frame members connected thereto in a fixed position relative to each other.

5. The system of claim 2,
wherein,
two frame members of the base frame each include a center joint to allow the two frame members to pivot relative to each other.

6. The system of claim 4,
wherein,
the locking mechanism is operable to be actuated by simultaneously (i) depressing a button of the locking mechanism, and (ii) pivoting a corresponding one of the wall frames.

7. The system of claim 6,
wherein,
the locking mechanism includes a hub that protrudes from a disk having a plurality of apertures extending at least partially therethrough,
the plurality of apertures are spaced around a circumference of the disk to define the plurality of locking points, and
the plurality of locking points define a pivot range of the wall frames relative to the base frame.

8. The system of claim 7,
wherein,
the button includes a plurality of posts operable to be removably and at least partially received within the plurality of apertures to cause the wall frames to be secured relative to the base frame.

9. The system of claim 7,
wherein,
the pivot range between the locking points is ninety degrees.

10. A method of manufacturing a reconfigurable pet potty system, the method comprising the step of:
securing a plurality of frames together via pivot joints and fixed joints, each of the plurality of frames (i) defined by a plurality of elongated frame members, and (ii) selectively pivotable with respect to another one or more of the plurality of frames,
wherein,
each of the plurality of frames define at least one of a plurality of interior voids,
each of the plurality of interior voids includes a sheet removably secured therein, and
each of the pivot joints include a locking mechanism (i) having locking points, and (ii) operable to allow pivoting of at least one of the plurality of frames between the locking points when the locking mechanism is actuated.

11. The method of claim 10,
wherein,
the plurality of frames includes a base frame secured between opposing wall frames, and
the plurality of frames are selectively reconfigurable between a use configuration and a storage configuration.

12. The method of claim 11,
wherein,
in the use configuration, the wall frames extend substantially perpendicular to the base frame, and
in the storage configuration, the wall frames extend substantially parallel to the base frame.

13. The method of claim 11,
wherein,
the pivot joints are pivotable to allow the wall frames to pivot relative to the base frame.

14. The method of claim 11,
wherein,
two frame members of the base frame each include a center joint to allow the two frame members to pivot relative to each other.

15. The method of claim 13,
wherein,
the locking mechanism is actuated via depressing a portion of the locking mechanism.

16. The method of claim 15,
wherein,
the locking mechanism includes a hub operable to define a pivot range of the wall frames relative to the base frame, and
the pivot range is between the locking points.

17. The method of claim 16,
wherein,
the hub includes a plurality of apertures extending at least partially therethrough, and
a portion of the locking mechanism is removably received within one or more of the plurality of apertures to secure the wall frames relative to the base frame.

18. The method of claim 16,
wherein,
the pivot range between the locking points is ninety degrees.

19. A reconfigurable pet potty system comprising:
a plurality of frames secured together by a plurality of joints, the plurality of frames including a plurality of elongated frame members;
wherein,
the plurality of joints include pivot joints operable to selectively reconfigure the plurality of frames between a first configuration and a second configuration, and
each of the pivot joints include a locking mechanism operable to (i) alternatively lock the frames in the first configuration or the second configuration, and (ii) allow pivoting of the frames between the first configuration and the second configuration when the locking mechanism is actuated.

20. The system of claim 19, wherein,
- the plurality of frames includes a base frame secured between opposing wall frames,
- the locking mechanism is actuated by simultaneously (i) depressing a button of the locking mechanism, and (ii) pivoting a corresponding one of the wall frames,
- the locking mechanism includes a disk having a plurality of apertures extending at least partially therethrough, and
- the button includes a plurality of posts operable to be removably and at least partially received within the plurality of apertures to cause the wall frames to be secured relative to the base frame.

* * * * *